July 24, 1962  B. V. ELLIOTT  3,045,338
APPARATUS FOR ADVANCING INTERNAL LINE-UP CLAMPS
THROUGH END-TO-END PIPE SECTIONS
Filed Aug. 15, 1960  2 Sheets-Sheet 1
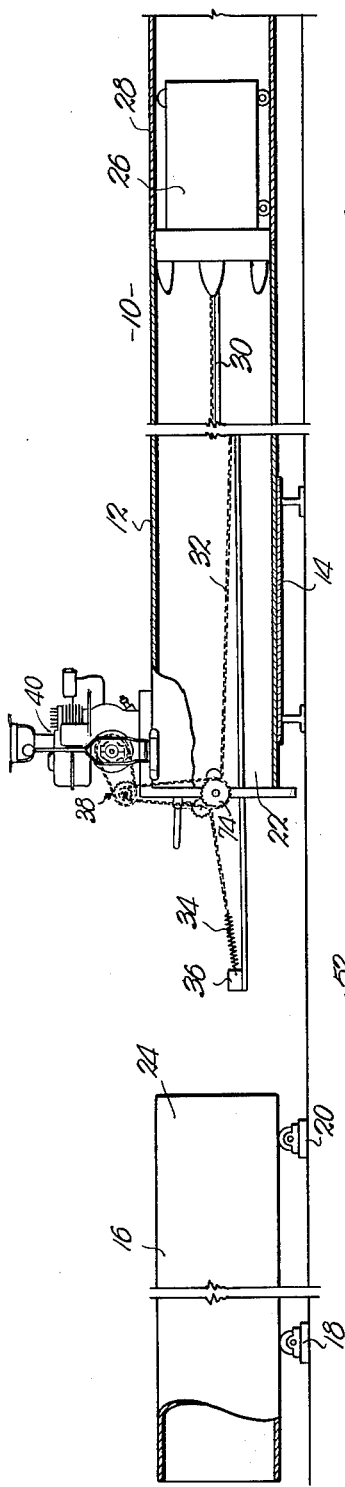
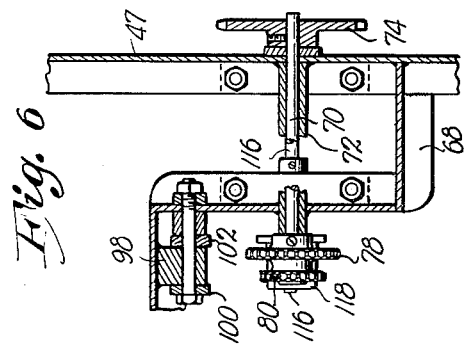
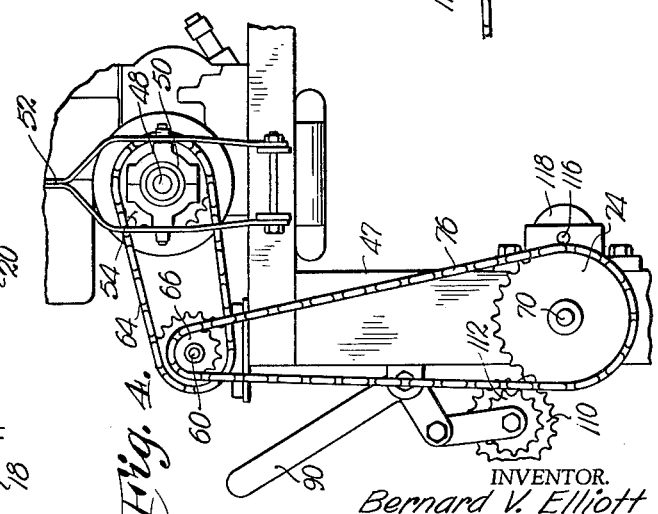
INVENTOR.
Bernard V. Elliott
BY
Hovey, Schmidt, Johnson & Hovey
ATTORNEYS.

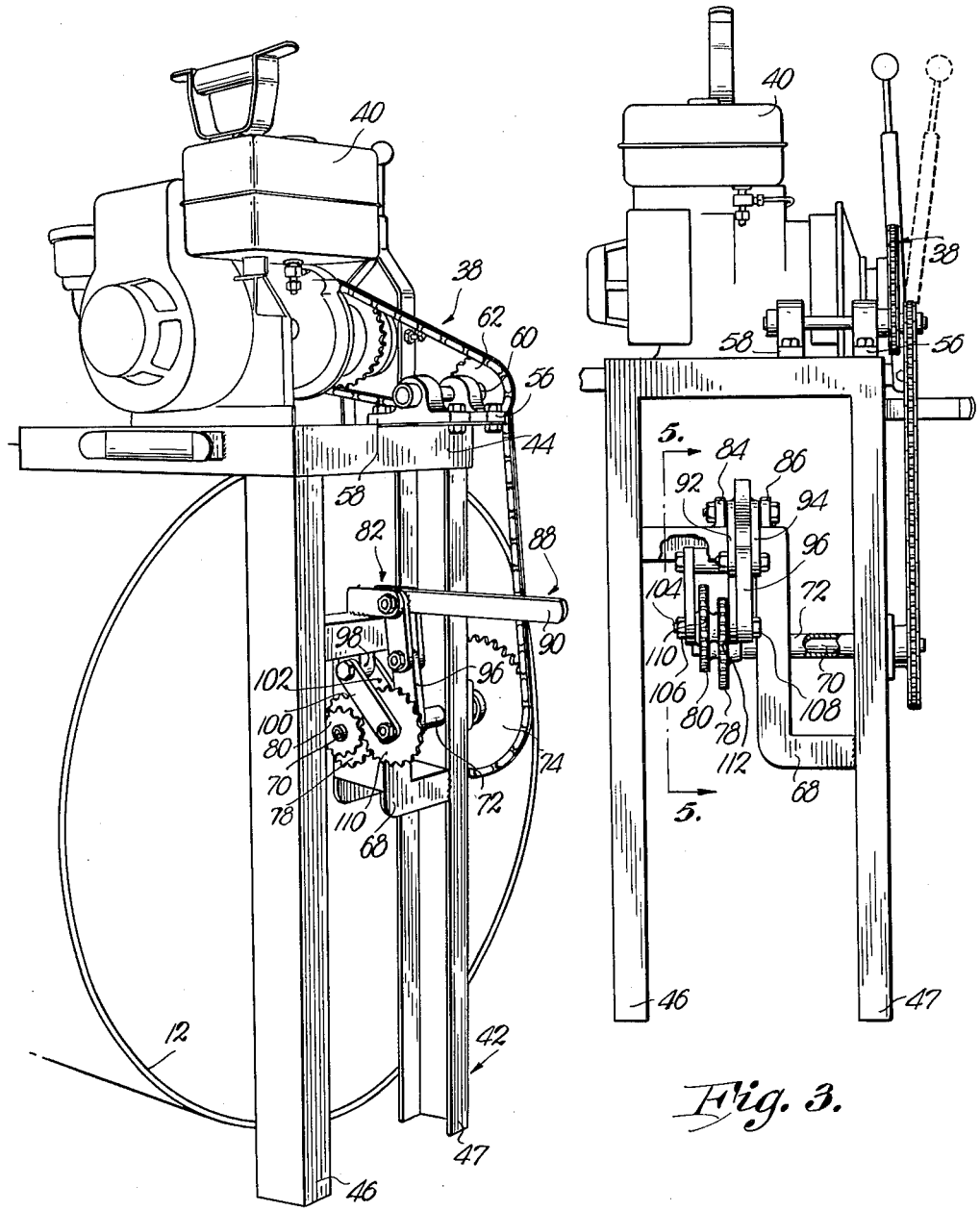

United States Patent Office 3,045,338
Patented July 24, 1962

3,045,338
APPARATUS FOR ADVANCING INTERNAL LINE-UP CLAMPS THROUGH END-TO-END PIPE SECTIONS
Bernard V. Elliott, Anderson, Mo., assignor to G. C. Price Co., Price Tower, Okla., a corporation of California
Filed Aug. 15, 1960, Ser. No. 49,683
7 Claims. (Cl. 29—272)

The present invention relates to apparatus for advancing normally internally disposed structure through pipe sections disposed in end-to-end relationship, and more particularly, the present invention relates to mechanism for advancing a pipe alignment clamp or similar structure disposed internally in a pipe line under construction.

In constructing a pipe line, as each section is placed in end-to-end abutting relationship with the previous sections laid, it is necessary to move an alignment clamp into the joint area between the new section and the formerly laid sections to align the joint for the subsequent welding operation. The alignment clamp is very heavy, and the past practice has been to use the manual efforts of a plurality of men to pull the clamp along the pipe line, or to power the clamp with compressed air for moving the clamp automatically. The manual movement of the clamp was unsatisfactory for the obvious reason that it took many men to move the clamp, and the compressed air solution was costly and unsatisfactory for various reasons.

The present invention, therefore, proposes to provide structure for moving an internally-disposed alignment clamp, welding machine or other apparatus, wherein the clamp or device to be moved is provided with an extended bar and rack over which a new section of pipe may be placed and wherein further, mechanical driving means are provided which may be disposed adjacent to the open end of the newly placed section which can be easily engaged with the bar and rack so that the same may be drawn into the new section, thereby drawing the clamp or other device.

It is, therefore, an object of the present invention to provide structure for moving an internally disposed alignment clamp or the like, including an extended bar and rack arrangement coupled with the device, and a portable source of mechanical driving power which may be removably engaged with the bar and rack for drawing the same and thereby the alignment clamp through the pipe line section.

It is another object of the present invention to provide structure substantially as described, wherein the source of driving power may be disengaged from the bar and rack, while a new section of pipe is placed therearound, the source of driving power being moved to the open end of the newly placed section where it is again engaged with the bar and rack to continue the advancement of the alignment clamp or other device through the pipe line.

It is another object of the present invention to provide structure substantially as above described, wherein the power source is provided with a clutching mechanism so that driving power may be selectively applied to the bar and rack as desired.

It is another object of the present invention to provide structure substantially as described above, wherein the rack consists of a chain, and the source of driving power includes a gear engageable with the chain from the bottom side of the chain, the source of driving power being further provided with an over-center toggle mechanism for tightening the chain over the gear to take up slack in the chain so that the driving force exerted will be positive.

Further objects and advantages of the present invention will appear hereinafter as the description of this invention proceeds, and various modifications and changes may be made to the structure of the present invention without departing from the spirit thereof. Such further objects and modifications and changes are intended to be covered by the scope of the appended claims.

In the drawings:

FIGURE 1 is a view partly in side elevation and partly in section of a pipe line in construction showing the general placement of the structure of the present invention when in use;

FIG. 2 is a perspective view of structure embodying the present invention associated with a partially shown section of pipe;

FIG. 3 is an end elevational view of the structure of FIG. 2 with portions broken away and shown in section for clarity;

FIG. 4 is a fragmentary, side elevational view of the structure shown in FIG. 3 showing details of the drive mechanism;

FIG. 5 is a cross-sectional view taken along line 5—5 of FIG. 3 looking in the direction of the arrows; and FIG. 6 is a cross-sectional view taken along line 6—6 of FIG. 5 looking in the direction of the arrows.

In FIG. 1 of the drawings, a pipe line under construction is shown and generally designated by the numeral 10. The pipe line construction consists of a first pipe section 12 which has already been properly laid and aligned, and which is supported in its location by a pipe line support 14. It may be assumed that pipe section 12 is the terminal section to that portion of the pipe line which has already been laid.

A second pipe section 16 is shown disposed on rollers 18 and 20 generally in end-to-end relationship to section 12, pipe section 16 therefore, being in position for assembly to the section 12 in end-to-end, abutting relationship as the construction of the pipe line 10 continues. The open terminal end of section 12 is designated by the numeral 22, and the end of section 16, which will eventually be placed in abutting engagement with open end 22, is identified by the numeral 24.

Disposed within section 12 of the pipe line, is an internal alignment clamp 26 which is disclosed in its position aligning the joint between section 12 and a previously laid section 28. An elongated bar 30 is coupled at one end to clamp 26 and extends from clamp 26 out of open end 22 of section 12.

Extending from alignment clamp 26 over the bar 30, is a chain rack 32 shown in dotted line in FIG. 1. The chain is coupled with the bar 30 or alignment clamp 26 as desired, at one end and is provided at the other end with a spring 34 coupling chain 32 to a chain support 36 supported on the free end of bar 30. Chain 32 is of a length and spring 34 is of a resiliency such that the chain 32 has a predetermined amount of slack therein for purposes which will become apparent as the description proceeds.

A portable power source is provided for the apparatus and is designated by the numeral 38. Power source 38 includes a portable internal combustion engine 40, and an engine-supporting frame 42 upon which engine 40 is mounted. Supporting frame 42 includes a top engine-supporting table 44, and a pair of upright table legs 46 and 47 extending downwardly from one end of the table 44. It will be noted that the frame structure 42 is of the proper height so that the table may be disposed in resting relationship or engagement with a pipe section 12.

The described relationship between the supporting frame 42 and pipe section 12 is particularly well shown in perspective in FIG. 2. Internal combustion engine 40 is provided with an output shaft 48 to which a clutch assembly 50 is coupled. Clutch assembly 50 has a manually operated handle 52 for engaging and disengaging clutch assembly 50. Details of the clutch assembly 50 have not been described since the same is the commonly known finger-cone clutch frequently used on lawn mowers and other apparatus powered by small internal combustion engines.

A driven gear 54 is mounted upon shaft 48 in such a manner that the shaft 48 may slip within the gear 54 when clutch 50 is disengaged, but also in such a manner that the rotating force of shaft 48 may be transferred to gear 54 when clutch 50 is engaged. Supported on the end of table 44 is a pair of shaft journals 56 and 58 which rotatably journal an idler shaft 60 in such a manner that the shaft 60 protrudes at its ends from the journals 56 and 58.

A first force transfer gear 62 is fixed upon shaft 60 in the same perpendicular plane in which driven gear 54 lies, and a chain 64 is trained over gears 54 and 62 to transfer driving force from shaft 48 to shaft 60.

A second force transfer gear 66 is fixed on shaft 60 in a perpendicular plane parallel to the plane in which first force transfer gear 62 is disposed.

A step-shaped brace 68 is fixed between legs 46 and 47 and there is journaled in leg 47 and brace 68, a driven shaft 70 which rotaates within a sleeve 72 extending from leg 47 to brace 68. Shaft 70 protrudes at its ends from the leg 47 and brace 68 and there is fixed at one end on shaft 70, a third force transfer gear 74 which is disposed in the same perpendicular plane with second force transfer gear 66. A chain 76 is trained over second force transfer gear 66 and third force transfer gear 74. A first drive gear 78 is fixed on the opposite end of shaft 70 from third force transfer gear 74. A second drive gear 80 parallel to the first gear 78 and smaller than gear 78 in diameter is fixed on shaft 70 adjacent to first drive gear 78.

An over-center toggle mechanism 82 is supported from brace 68. Over-center toggle mechanism 82 includes a pair of spaced, parallel fixed links 84 and 86. Fixed links 84 and 86 are welded to brace 68 at one end and extend forwardly from the frame 42.

A bell crank assembly 88 forms a part of toggle mechanism 82 and includes a bell crank lever 90 welded at one end to one end of each of a pair of parallel, spaced bell crank links 92 and 94. The end of bell crank lever 90 and the ends of links 92 and 94, which are welded together, are pivotally connected to the forwardmost end of fixed links 84 and 86. The ends of bell crank links 92 and 94, remote from lever 90, are pivotally connected to a shifting link 96.

A bearing 98 is fixed on the lower side of the top step of brace 68, and a pair of spaced, parallel pivot links 100 and 102 are journaled at one end for pivotal movement in bearing 98. The opposite end of links 100 and 102, together with the end of shifting link 96, furthest removed from bell crank links 92 and 94, provide a journal for a shaft 104 having threaded ends on which fastening means 106 and 108 are threadably mounted.

Links 100 and 102 are spaced, and there is rotatably mounted on shaft 104 between them a first tightening gear 110, and a second tightening gear 112. Gear 110 is mounted in the same perpendicular plane with second drive gear 80 and gear 112 is mounted in the same perpendicular plane with first drive gear 78. Shifting link 96 is pivotally coupled with shaft 104 immediately adjacent to pivot link 102 and between links 100 and 102. A bearing journal 114 is mounted on the rear side of brace 68 and rotatably supports a shaft 116 on which is mounted an idler roller 118. Idler roller 118 is mounted so as to be positioned immediately behind the drive gears 78 and 80 and in substantially the same horizontal plane.

In operation, the frame 42 is placed in resting engagement upon a pipe section 12 and the chain 32 is trained over one of the drive gears 78 and 80. The internal combustion engine 40 is started and the clutch structure 50 is engaged so that driving force is transferred through gear 54, chain 64, gear 62, shaft 60, gear 66, chain 76, gear 74, and shaft 70 to drive gears 78 and 80. The chain 32 is trained over the top of one of the drive gears 78 or 80 and under the bottom of idler roller 118.

The bell crank assembly 88 which is in effect an over-center toggle mechanism, is then manually operated by movement of lever 90 to move the tightener gears 110 and 112 downwardly. If the chain is trained over the gear 80, the tightener gear 110 will engage the top of the chain to insure a tight driving connection between gear 80 and a chain 32. If, on the other hand, the chain 32 is trained over drive gear 78, the tightener gear 112 will engage the top of the chain to perform the same function. The selection between drive gears 78 and 80 is one which simply controls the speed with which the clamp 26 or other device will be moved through the end-to-end pipe sections.

The driving effect upon the chain 32 is to draw the bar 30 and the clamp 26 to advance the clamp 26 through the pipe sections to a point immediately adjacent to the open end 22 of pipe section 12. At this point, the bell crank assembly 88 may be operated to release the tension on chain 32 after the clutch assembly 50 has been disengaged, and the chain 32 may be removed from drive gear 78 or 80. The clamp 42 and engine 40 may then be moved out of the way and pipe section 16 may be moved in end-to-end abutting relationship with the pipe section 12.

The length of the bar 30 and chain 32 are sufficient to extend through the new section 16 and protrude from the end thereof remote from section 12. The frame 42 and engine 40 may then be placed in engagement with the new open end and re-coupled, as described, with chain 32 and after engagement of clutch assembly 50, the alignment clamp 26 may be advanced a sufficient amount further to align the end 24 of section 16 and the end 22 of section 12 for external welding of the two sections.

It may, therefore, be seen that with the structure described, the simple device of leapfrogging sections as they are added to the pipe line, is used to continually advance the alignment clamp and the same may be accomplished with very little manual effort except for the movement of the frame 42 and engine 40.

It is also apparent that the device described is simple in construction, inexpensive to manufacture and will render satisfactory performance.

Having thus described the invention, what is claimed as new and desired to be secured by Letters Patent is:

1. Apparatus for advancing normally internally disposed structure through pipe sections disposed in end-to-end relationship, said apparatus including an alignment clamp substantially shorter than individual pipe sections; a prime mover adapted to be positioned adjacent the open end of a terminal pipe section; elongated means extending through said terminal pipe section and terminating adjacent said open end of the latter and including an elongated bar secured to said clamp and a chain coupled at its ends with respective ends of said bar; and drive means operably connected to said prime mover and adapted to be removably coupled to the chain of said elongated means for shifting said elongated means and thereby the clamp toward said open end of said terminal pipe section during operation of said prime mover whereby upon advancement of the clamp to a position adjacent said open end of said one pipe section, the prime mover and drive means may be disconnected from said elongated means, another pipe placed in end-to-end relationship to said terminal pipe with said elongated means extending therethrough, the prime mover and drive means shifted to disposition adjacent the open end of said other pipe section and said drive means operably recoupled to said elongated means.

2. The invention as set forth in claim 1, wherein said prime mover includes an internal combustion engine, and a frame coupled with said engine to support the latter, said frame being adapted to be supported by said terminal pipe section adjacent the open end thereof.

3. The invention as set forth in claim 1, wherein said chain is of a length sufficient to provide a predetermined amount of slack in said chain after it has been coupled to said bar.

4. The invention as set forth in claim 1, wherein said drive means includes a drive gear, and a clutch operatively interposed between said gear and said prime mover for selectively transferring driving power from the latter to said gear.

5. Apparatus for advancing normally internally disposed structure through pipe sections disposed in end-to-end relationship, said apparatus including an alignment clamp substantially shorter than individual pipe sections; an internal combustion engine; a frame coupled with said engine to support the latter, said frame being adapted to be supported upon the terminal pipe section adjacent the open end thereof to position said engine adjacent to said open end; an elongated bar connected at one end to said clamp, said elongated bar extending through said terminal pipe section and terminating adjacent said open end of the latter; an elongated chain coupled at its ends to respective ends of said bar, said chain being of a length sufficient to provide a predetermined amount of slack in said chain after it has been coupled to said bar; a drive gear rotatably mounted on said frame and positioned to be engaged with said chain when said frame is coupled to the open end of a terminal pipe section and said chain emplaced over said gear; and a clutch operatively coupled with said engine and positioned relative to said gear to selectively couple said engine and said gear for selectively transferring driving power from said engine to said gear for shifting said chain and bar and thereby the structure toward said open end of said terminal pipe section during operation of said engine and coupling by said clutch of said engine to said gear whereby upon advancement of the clamp to a position adjacent said open end of said one pipe section, the gear may be disengaged from said chain, the engine, frame, clutch and gear removed, another pipe placed in end-to-end relationship to said terminal pipe with said bar and chain extending therethrough, the engine, frame, clutch and gear shifted to disposition adjacent the open end of said other pipe section, said frame supported upon the other pipe section adjacent the open end of said other section and said gear and chain operably recoupled.

6. The invention as set forth in claim 5, in further combination with chain-tightening means mounted on said frame adjacent to said gear for removably engaging said chain to tighten the engagement of the latter with said gear.

7. The invention as set forth in claim 6, wherein said chain-tightening means includes an over-center toggle mechanism mounted on said frame, and a gear mounted on said toggle mechanism.

References Cited in the file of this patent

UNITED STATES PATENTS

| | | |
|---|---|---|
| 187,870 | Lally | Feb. 27, 1877 |
| 317,158 | Lowrie | May 5, 1885 |
| 350,742 | Heyde | Oct. 12, 1886 |

UNITED STATES PATENT OFFICE
CERTIFICATE OF CORRECTION

Patent No. 3,045,338                          July 24, 1962

Bernard V. Elliott

It is hereby certified that error appears in the above numbered patent requiring correction and that the said Letters Patent should read as corrected below.

In the grant, line 2, for "assignor to G. C. Price Co., of Price Tower, Oklahoma" read -- assignor to H. C. Price Co., of Bartlesville, Oklahoma --; line 12, for " G. C. Price Co., it successors" read -- H. C. Price Co., it successors --; in the heading to the printed specification, lines 5 and 6, for "assignor to G. C. Price Co., Price Tower, Okla." read -- assignor to H. C. Price Co., Bartlesville, Okla. --.

Signed and sealed this 30th day of April 1963.

(SEAL)
Attest:

ERNEST W. SWIDER                        DAVID L. LADD
Attesting Officer                            Commissioner of Patents